United States Patent
Kim et al.

(10) Patent No.: US 8,040,371 B2
(45) Date of Patent: Oct. 18, 2011

(54) THREE-DIMENSIONAL DISPLAY DEVICE AND DRIVING METHOD THEREOF

(75) Inventors: Beom-Shik Kim, Yongin-si (KR);
Jang-Doo Lee, Yongin-si (KR);
Hyoung-Wook Jang, Yongin-si (KR);
Hui Nam, Yongin-si (KR);
Myoung-Seop Song, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 1390 days.

(21) Appl. No.: 11/584,282

(22) Filed: Oct. 20, 2006

(65) Prior Publication Data
US 2007/0103547 A1 May 10, 2007

(30) Foreign Application Priority Data
Nov. 4, 2005 (KR) .................. 10-2005-0105342

(51) Int. Cl.
*G02B 27/22* (2006.01)
(52) U.S. Cl. ............. 348/51; 345/694; 349/15; 359/465
(58) Field of Classification Search .............. 348/42–43, 348/51–55; 345/4–9, 694; 349/15; 359/464–466
See application file for complete search history.

(56) References Cited

U.S. PATENT DOCUMENTS

| | | | |
|---|---|---|---|
| 5,528,735 A * | 6/1996 | Strasnick et al. | 345/427 |
| 7,199,845 B2 * | 4/2007 | Koyama et al. | 349/15 |
| 7,345,664 B2 * | 3/2008 | Chang | 345/87 |
| 7,349,568 B2 * | 3/2008 | Takemoto et al. | 382/154 |
| 7,471,346 B2 * | 12/2008 | Tanaka et al. | 349/15 |
| 7,506,984 B2 * | 3/2009 | Saishu et al. | 353/7 |
| 7,557,871 B2 * | 7/2009 | Matsumoto et al. | 349/15 |
| 7,583,327 B2 * | 9/2009 | Takatani | 349/15 |
| 7,649,688 B2 * | 1/2010 | Racette et al. | 359/464 |
| 7,868,952 B2 * | 1/2011 | Fukushima et al. | 349/15 |

FOREIGN PATENT DOCUMENTS

| | | |
|---|---|---|
| CN | 1476730 A | 2/2004 |
| CN | 1655011 A | 8/2005 |
| CN | 1685277 A | 10/2005 |
| DE | 200 22 456 U1 | 11/2001 |
| EP | 1 650 983 A1 | 4/2006 |
| GB | 2 410 093 A | 7/2005 |
| JP | 09-159970 | 6/1997 |
| JP | 2005-134663 | 5/2005 |
| WO | WO 95/05052 | 2/1995 |
| WO | WO 2004/063914 A2 | 7/2004 |

OTHER PUBLICATIONS

European Search Report dated Apr. 11, 2007, for EP 06123455.5, in the name of Samsung SDI Co., Ltd.

* cited by examiner

*Primary Examiner* — Moustafa M Meky
(74) *Attorney, Agent, or Firm* — Christie, Parker & Hale, LLP

(57) ABSTRACT

A three-dimensional display device according to the present invention includes a panel that time-shares images and displays left and right eye images, a panel control unit for controlling the panel by applying a display control signal that includes vertical and horizontal signals to the panel, a barrier facing the panel and separating the images of the panel into user left and right eye images, and a barrier control unit for controlling the barrier. The panel can be converted between a first mode of a portrait-type view and a second mode of a landscape-type view, and the barrier may be operated corresponding to the mode conversion of the panel.

19 Claims, 15 Drawing Sheets

THREE-DIMENSIONAL DISPLAY DEVICE AND DRIVING METHOD THEREOF

CROSS-REFERENCE TO RELATED APPLICATION

This application claims priority to and the benefit of Korean Patent Application No. 10-2005-0105342, filed in the Korean Intellectual Property Office, on Nov. 4, 2005, the entire content of which is incorporated herein by reference.

BACKGROUND OF THE INVENTION

1. Field of the Invention

The present invention relates to a three-dimensional display device, and in particular, to an autostereoscopic three-dimensional display device using a parallax barrier, and a driving method thereof.

2. Description of the Related Art

A three-dimensional display device may be categorized as a stereoscopic display device where a user wears viewing aids, such as polarizing glasses, or an autostereoscopic display device where the user can see a desired three-dimensional image without wearing such viewing aids.

A common autostereoscopic display device utilizes an optical separation element, such as a lenticular lens, a parallax barrier, or a microlens array, to spatially separate or isolate the left-eye image part and the right-eye image part displayed at an image display unit in the directions of the left and right eyes of the user, respectively.

In particular, the parallax barrier may be formed with a liquid crystal shutter utilizing a transmission type of liquid crystal display, and in this case, it may be converted between a two-dimensional mode and a three-dimensional mode. Thus the parallax barrier can be applied to laptop computers or cellular phones.

The parallax barrier includes stripe-shaped light interception portions and light transmission portions. The parallax barrier selectively separates left and right eye images displayed at the image display unit through the light transmission portions such that the left and right eye images are respectively provided to the left and right eyes of the user.

Generally, a three-dimensional display device of the parallax barrier type spatially separates the left and right eye images.

However, the resolution of a three-dimensional image produced by such a display device is no more than half as fine as that of two-dimensional images produced by such a display device because the right and left eye images of the latter are provided to the respective eyes of the user.

Recently, display devices that can provide both portrait-type views and landscape-type views by rotating the display device have been developed.

However, conventional parallax barriers are adapted to provide only one of the portrait- or landscape-type views.

SUMMARY OF THE INVENTION

It is an aspect of the present invention to provide a three-dimensional display device and a driving method of the three-dimensional display device that can display a three-dimensional image having a high resolution when the three-dimensional display device is oriented to provide a portrait-type view and when it is oriented to provide a landscape-type view.

A three-dimensional display device according to the present invention includes a panel adapted to time-share a image and to display left and right eye images, a panel control unit for controlling the panel by applying a display control signal that includes vertical and horizontal signals to the panel, a barrier facing the panel and for separating the image of the panel into left and right eye images, and a barrier control unit for controlling the barrier. The panel may be adapted to be oriented in a first mode providing a portrait-type view and a second mode providing a landscape-type view, and the barrier may be operated corresponding to the orientation mode of the panel.

The barrier may include a first substrate, a plurality of first electrodes arranged along a first direction on the first substrate, a plurality of second electrodes arranged between the first electrodes on the first substrate, a second substrate facing the first substrate, a plurality of third electrodes arranged on the second substrate along a second direction that is perpendicular to the first direction, a plurality of fourth electrodes arranged between the third electrodes on the second substrate, and a liquid crystal layer located between the first substrate and the second substrate.

The barrier control unit may be adapted to apply a reference voltage or a driving voltage to the first, second, third, and fourth electrodes according to a barrier control signal synchronized with the vertical signal.

The vertical signal may have a higher level voltage during a first period, a lower level voltage during a second period following the first period, the higher level voltage during a third period following the second period, the higher level voltage during a fourth period following the third period. The first, second, third, and fourth periods constitute a repeatable cycle.

The panel may display, during the first period, a first image including the left and right eye images formed in a first pattern, and the panel may display, during the third period, a second image including the left and right eye images formed in a second pattern. The second pattern is opposite to the first pattern.

When the panel is oriented in the first mode, a plurality of first pixel columns and a plurality of second pixel columns respectively corresponding to the third electrodes and the fourth electrodes may be arranged along the second direction and arranged alternately and repeatedly along the first direction on the panel.

The left eye image and the right eye image of the first image may be displayed on the first pixel columns and the second pixel columns, respectively, during the first period.

The right eye image and the left eye image of the second image may be displayed on the first pixel columns and the second pixel columns, respectively, during the third period.

When the panel is oriented in the second mode, a plurality of first pixel rows and a plurality of second pixel rows respectively corresponding to the first electrodes and the second electrodes may be arranged along the second direction and arranged alternately and repeatedly along the first direction on the panel.

The left eye image and the right eye image of the first image may be displayed on the first pixel rows and the second pixel rows, respectively, during the first period.

The right eye image and the left eye image of the second image may be displayed on the first pixel rows and the second pixel rows, respectively, during the third period.

When the panel is oriented in the first mode, the reference voltage may be applied to the first electrodes and the second electrodes during the first period, the second period, the third period, and the fourth period.

The driving voltage may be applied to the third electrodes during the first period and to the fourth electrodes during the third period.

When the panel is oriented in the second mode, the reference voltage may be applied to the third electrodes and the fourth electrodes during the first period, the second period, the third period, and the fourth period.

The driving voltage may be applied to the first electrodes during the first period and to the second electrodes during the third period.

The barrier may further include a first connection electrode for electrically connecting the first electrodes to each other, a second connection electrode for electrically connecting the second electrodes to each other, a third connection electrode for electrically connecting the third electrodes to each other, and a fourth connection electrode for electrically connecting the fourth electrodes to each other.

The panel may separate the image into the left and right eye images by subpixel units.

The panel may separate the image into the left and right eye images by pixel units.

A driving method of the three-dimensional display device according to the present invention includes applying the display control signal to the panel and the barrier control unit, applying the barrier driving signal to the barrier, applying a reference voltage or a driving voltage to electrodes of the barrier according to the barrier driving signal, forming light transmission portions and light interception portions in the barrier according to operation of the liquid crystal layer according to application of the driving voltage, and indicating the display control signal on the panel. By way of example, the display control signal may include an image signal (e.g., R, G, and B data), a horizontal signal, and a vertical signal.

The reference voltage may be a ground voltage, and the driving voltage may be a predetermined positive or negative voltage.

The driving voltage may alternate between a positive level and a negative level at a predetermined frequency.

DETAILED DESCRIPTION

The present invention will be described more fully hereinafter with reference to the accompanying drawings, in which certain exemplary embodiments of the present invention are shown.

Figure 1:
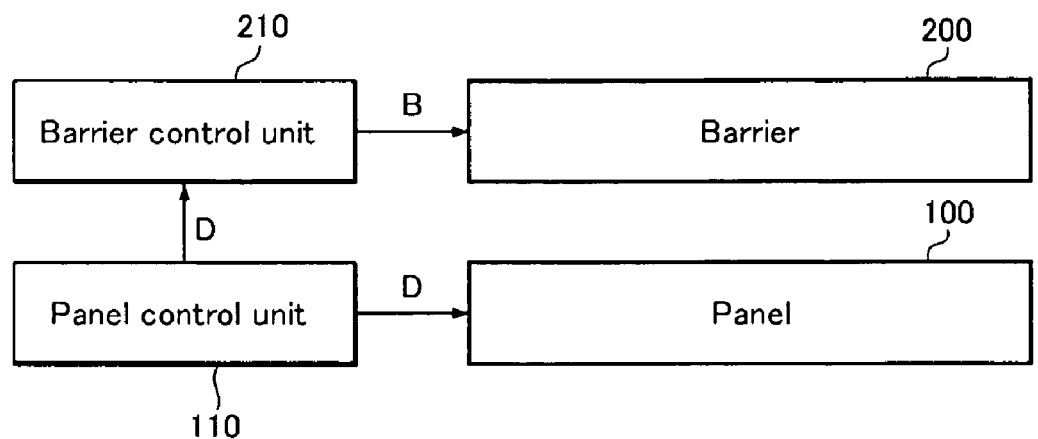
FIG. 1 is a schematic block diagram of a three-dimensional display device according to an exemplary embodiment of the present invention.

FIG. 1 is a schematic block diagram of a three-dimensional display device according to an exemplary embodiment of the present invention. As shown in FIG. 1, the three-dimensional display device includes a panel 100, a panel control unit 110, a barrier 200, and a barrier control unit 210.

A display control signal D including an image signal (e.g. R, G, and B data), a horizontal signal, and a vertical signal is input to each of the barrier control unit 210 and the panel 100 by the panel control unit 110.

The panel 100 displays left and right eye images having a certain or predetermined pattern according to the display control signal D input by the panel control unit 110.

In the exemplary embodiment of the present invention, a first image and a second image that have different patterns of the left and right eye images relative to each other are repeatedly displayed at a frequency, which may be predetermined.

Any suitable display device may be used as the panel 100. For instance, the panel 100 may be formed with a cathode ray tube, a liquid crystal display, a plasma display panel, a field emission display device, an organic electroluminescence display device, or any other suitable display device(s).

The barrier control unit 210 receives the display control signal D from the panel control unit 110 and it operates the barrier 200.

Electrodes of the barrier 200 are formed (or arranged) in a fashion that can separate the right and left eye images during operation in a first mode M1 to provide a portrait-type view and during operation in a second mode M2 to provide a landscape-type view.

The arrangement of the electrodes will be described more fully hereinafter with respect to the drawings.

Figure 2:
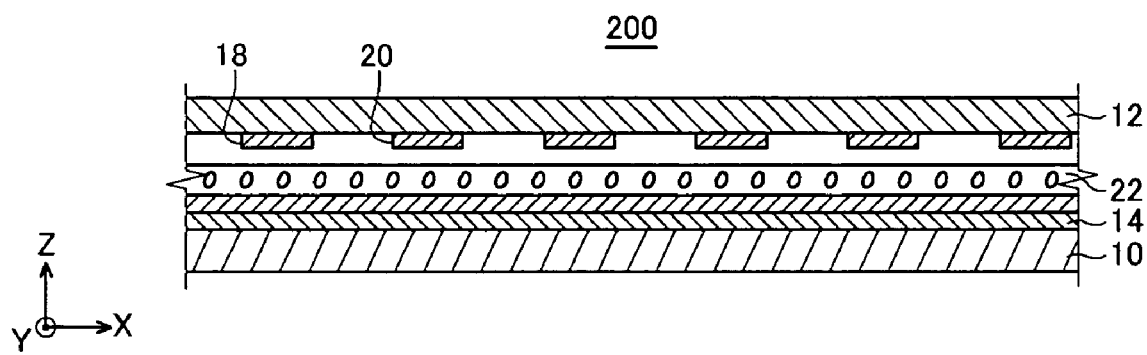
FIG. 2 is a partial sectional view of a barrier of the three-dimensional display device according to the exemplary embodiment of the present invention.

FIG. 2 shows a partial sectional view of the barrier 200 of the three-dimensional display device according to the exemplary embodiment of the present invention. As shown in FIG. 2, the barrier 200 includes a first substrate 10 and a second substrate 12 having a certain or predetermined distance therebetween. The first substrate 10 and the second substrate 12 may be formed as rectangular glass substrates.

Electrodes for operating liquid crystals 22 located between the first substrate 10 and the second substrate 12 are formed on respective inner surfaces of the first substrate 10 and the second substrate 12.

First electrodes 14 and second electrodes 16 (shown in FIG. 3, for example) are formed on the first substrate 10, and third electrodes 18 and fourth electrodes 20 are formed on the second substrate 12.

The first electrodes 14, second electrodes 16, third electrodes 18, and fourth electrodes 20 may be formed with a transparent material such as indium tin oxide (ITO). The structure of these electrodes will be described more fully hereinafter.

Figure 3:
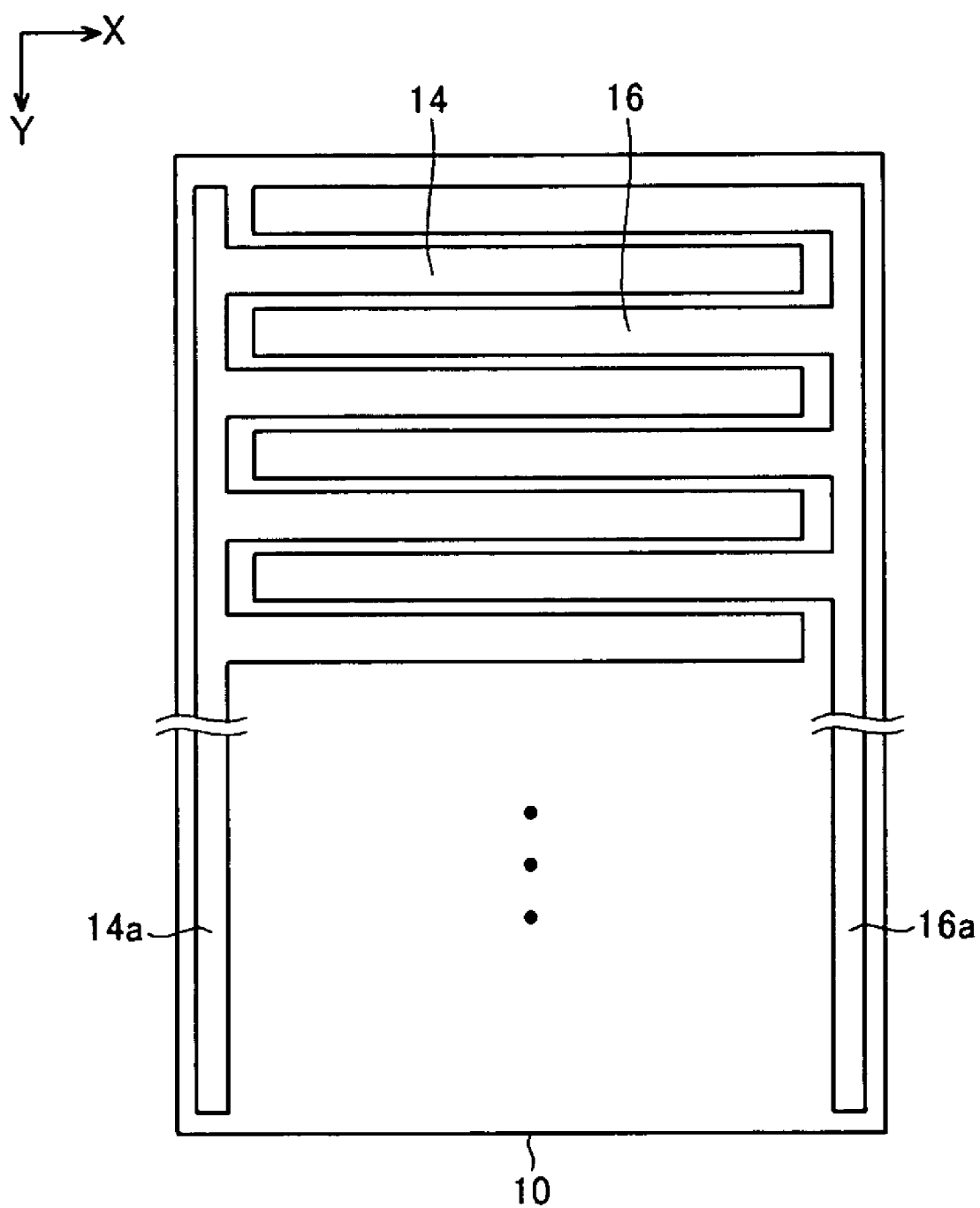
FIG. 3 is a plan view of first electrodes and second electrodes formed on a first substrate.

FIG. 3 is a plan view of the first electrodes and the second electrodes formed on the first substrate. As shown in FIG. 3, the first electrodes 14 are formed to extend along a first direction corresponding to a shorter side of the first substrate 10 (the direction of the X-axis of FIG. 3) on the first substrate 10.

The first electrodes 14 are formed at intervals (e.g., predetermined intervals) on the first substrate 10 in a striped pattern.

In addition, a first connection electrode 14a that electrically connects the first electrodes 14 is formed on the first substrate 10 to extend along a second direction (the direction of the Y-axis of FIG. 3) that is perpendicular to the first direction, and the first connection electrode 14a is connected to an end of each of the first electrodes 14.

In substantially the same way as the first electrodes 14 and the first connection electrode 14a are arranged, the second electrodes 16 and a second connection electrode 16a that electrically connects the second electrodes 16 are formed on the first substrate 10. In particular, the second electrodes 16 are formed on the first substrate 10 to extend along the first direction, and are arranged between the first electrodes 14 in a striped pattern.

In addition, the second connection electrode 16a is formed on the first substrate 10 to extend along the second direction that is perpendicular to the first direction and is connected to an end of each of the second electrodes 16.

The first electrodes 14 and the second electrodes 16 and the first connection electrode 14a and the second connection electrode 16a formed on the first substrate 10 cover substantially all the inner surface area of the first substrate 10 corresponding to an active display area of the panel 100, the coverage not including gaps formed between the first electrodes 14 and the second electrodes 16.

Figure 4:
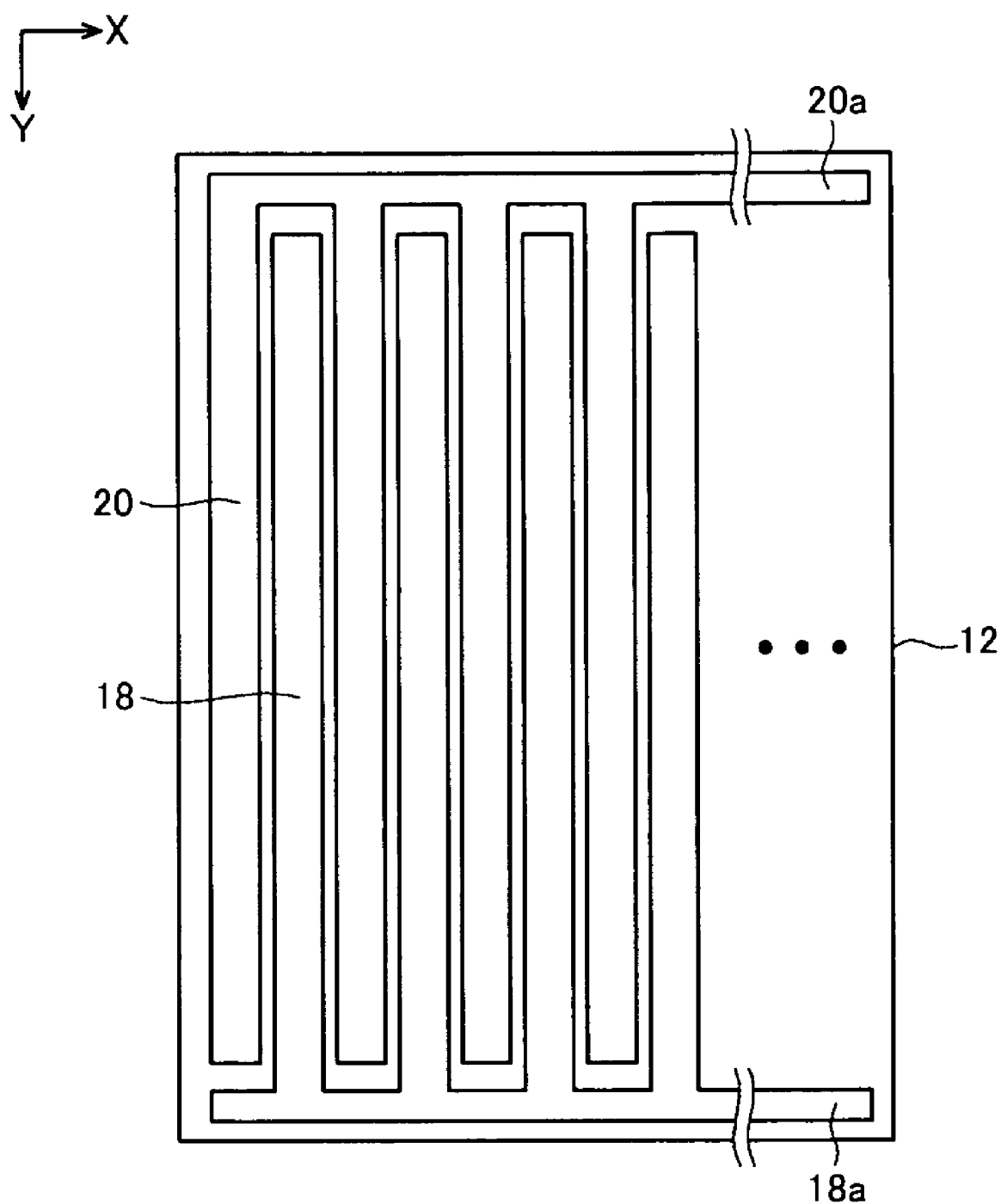
FIG. 4 is a plan view of third electrodes and fourth electrodes formed on a second substrate.

FIG. 4 is a plan view of the third electrodes and the fourth electrodes formed on the second substrate 12. As shown in FIG. 4, the third electrodes 18 and the fourth electrodes 20, and a third connection electrode 18a that connects the third electrodes 18 and a fourth connection electrode 20a that connects the fourth electrodes 20 are formed on the second substrate 12.

The third electrodes 18 and the fourth electrodes 20 are arranged to extend along the second direction (the direction of the Y-axis in FIG. 4) that is perpendicular to the first direction (the direction of the X-axis in FIG. 4) and are arranged in a striped pattern.

More specifically, the first electrodes 14 and the second electrodes 16 and the third electrodes 18 and the fourth electrodes 20 are arranged to be perpendicular to each other when the first substrate 10 and the second substrate 12 are arranged opposite one another.

The third electrodes 18 and the fourth electrodes 20 and the third connection electrode 18a and the fourth connection electrode 20a formed on the second substrate 12 cover substantially all the inner surface area of the second substrate 12 corresponding to the active display area of the panel 100, the coverage not including gaps formed between the third electrodes 18 and the fourth electrodes 20.

A driving method in which the three-dimensional display device according to the exemplary embodiment of the present invention is operated will be described hereinafter in more detail.

Figure 5:
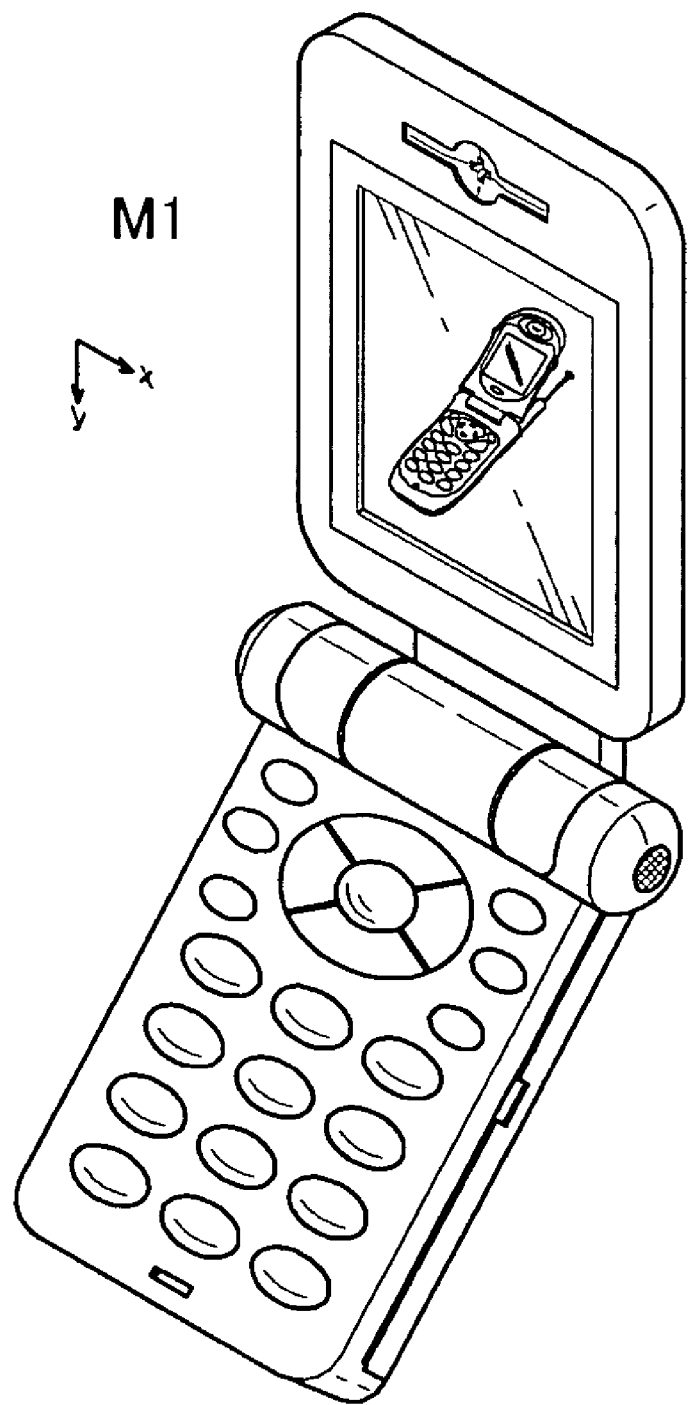
FIG. 5 is a perspective view of an electronic device operating in a first mode for which the three-dimensional display device according to the exemplary embodiment of the present invention has been adapted.

FIG. 5 shows an electronic device for which the three-dimensional display device according to the exemplary embodiment of the present invention is used. As shown, the electronic device may be a mobile phone.

During operation of the three-dimensional display device in the first mode M1, the panel 100 displays a portrait-type view. Generally, operation of the barrier corresponds to an orientation of the panel. The driving method of the three-dimensional display device will be described more concretely hereinafter.

Figure 6:
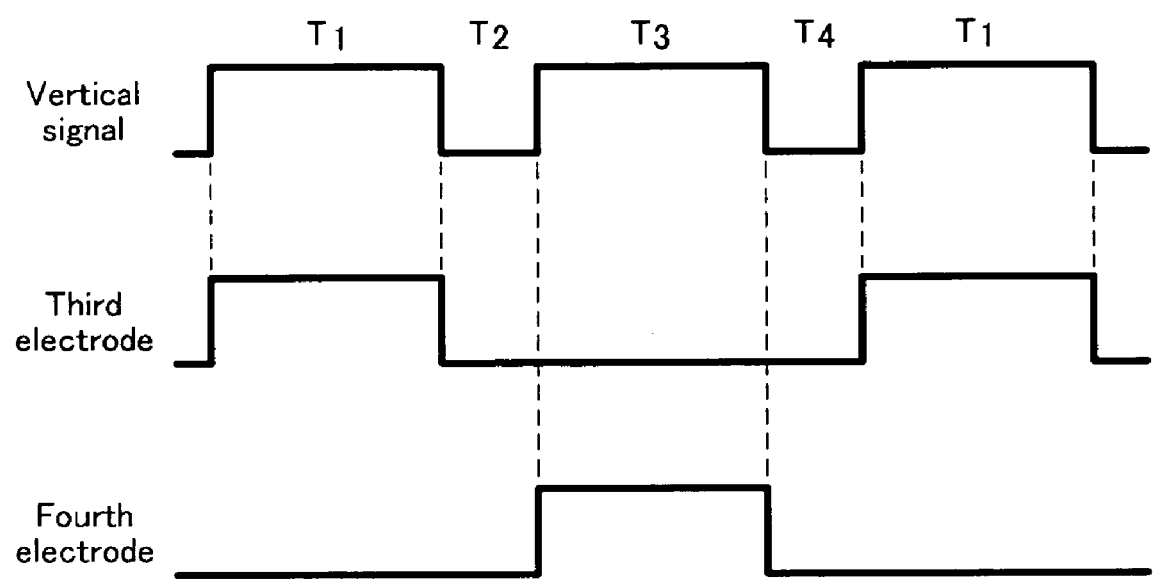
FIG. 6 is a graph showing relationships between a vertical signal and voltages applied to the third electrodes and the fourth electrodes when the three-dimensional display device is oriented in the first mode.

FIG. 6 shows in graphical form relationships between the vertical signal, a voltage applied to the third electrodes 18, and a voltage applied to the fourth electrodes 20 in the first mode M1.

The vertical signal input by the panel control unit 110 includes a series of voltages. During a first period $T_1$, the vertical signal has a higher level voltage. During a second period $T_2$, the vertical signal has a lower level voltage. During a third period $T_3$, the vertical signal has the higher voltage. During a fourth period $T_4$, the vertical signal has the lower level voltage.

The barrier 200 is operated by a barrier driving signal that is synchronized with the vertical signal. That is, during the first period $T_1$, a driving voltage is applied to the third electrodes, and during the third period $T_3$, the driving voltage is applied to the fourth electrodes.

Figure 7A:
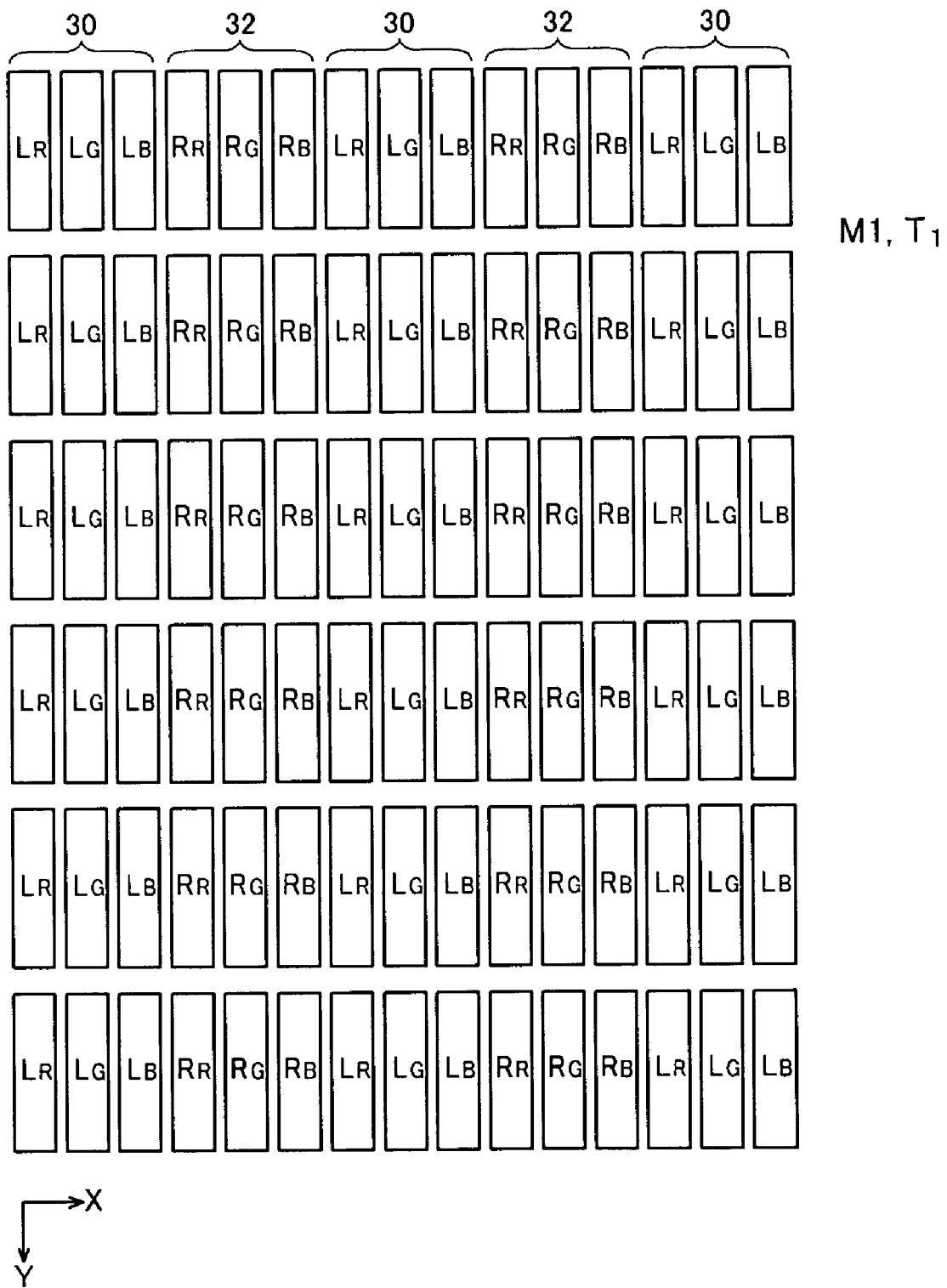
FIG. 7A is a schematic view showing arrays of pixels in the first mode during the first period.
Figure 7B:
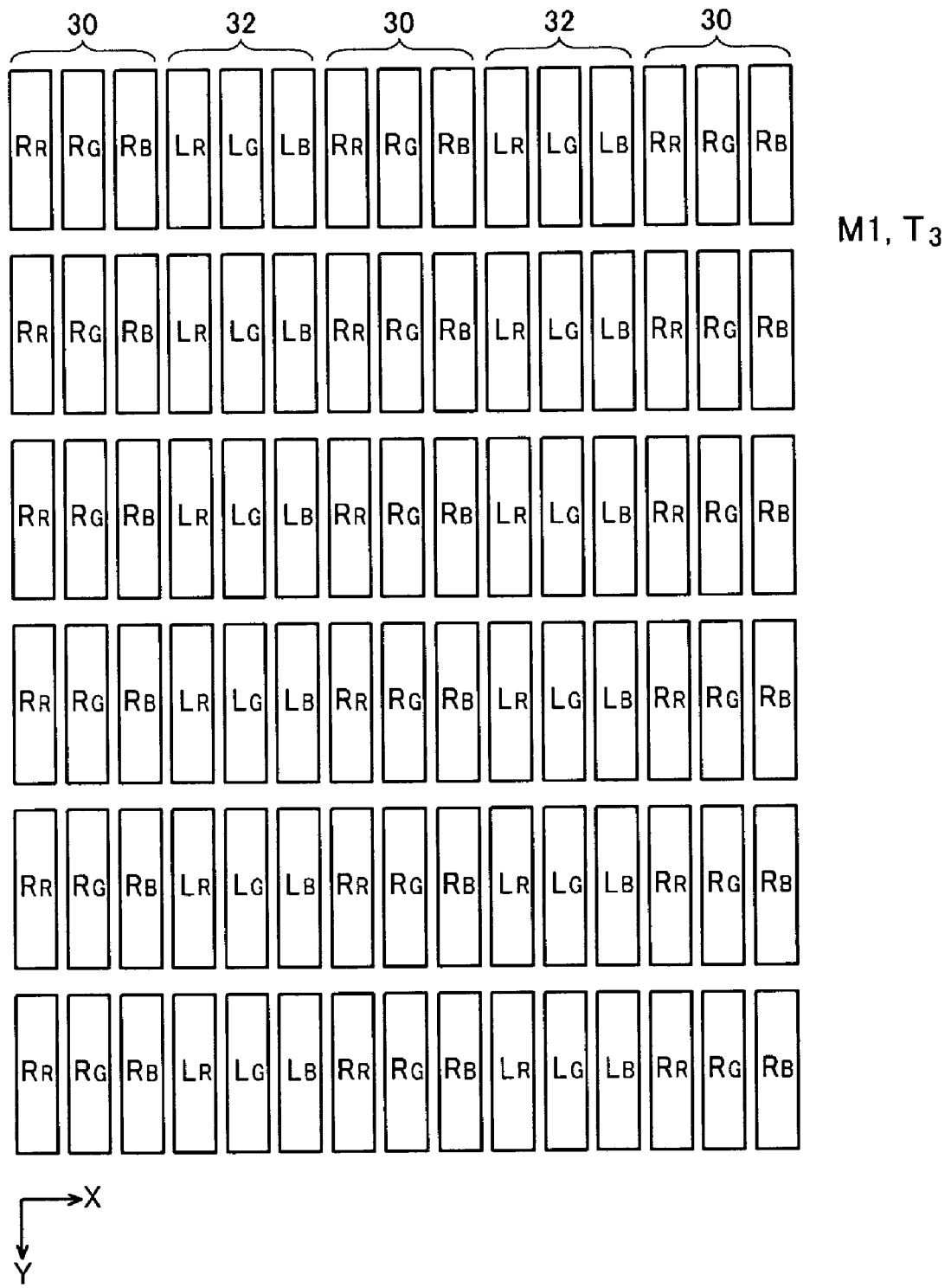
FIG. 7B is a schematic view showing arrays of pixels in the first mode during the third period.

An operation of the panel in the first mode M1 will be described hereinafter in more detail. FIGS. 7A and 7B each show an array of pixels. First pixel columns 30 and second pixel columns 32 are formed along the second direction (the direction of the Y-axis in FIG. 7A) and are arranged alternately and repeatedly along the first direction (the direction of the X-axis in FIG. 7A).

As shown in FIG. 7A, in the first period $T_1$, the first pixel columns 30 display the left eye image corresponding to a left eye image signal, and the second pixel columns 32 display a right eye image corresponding to a right eye image signal. In more detail, sub pixels of the first pixel columns 30 display $R_R$, $R_G$ and $R_B$ images. Similarly, sub pixels of the second pixel columns 32 display $L_R$, $L_G$ and $L_B$ images.

Accordingly, a first image is displayed on the panel during the first period $T_1$.

Then, as shown in FIG. 7B, in the third period $T_3$, the first pixel columns 30 display a right eye image corresponding to a right eye image signal, and the second pixel columns 32 display a left eye image corresponding to a left eye image signal. Accordingly, a second image is displayed on the panel during the third period $T_3$.

Figure 8A:
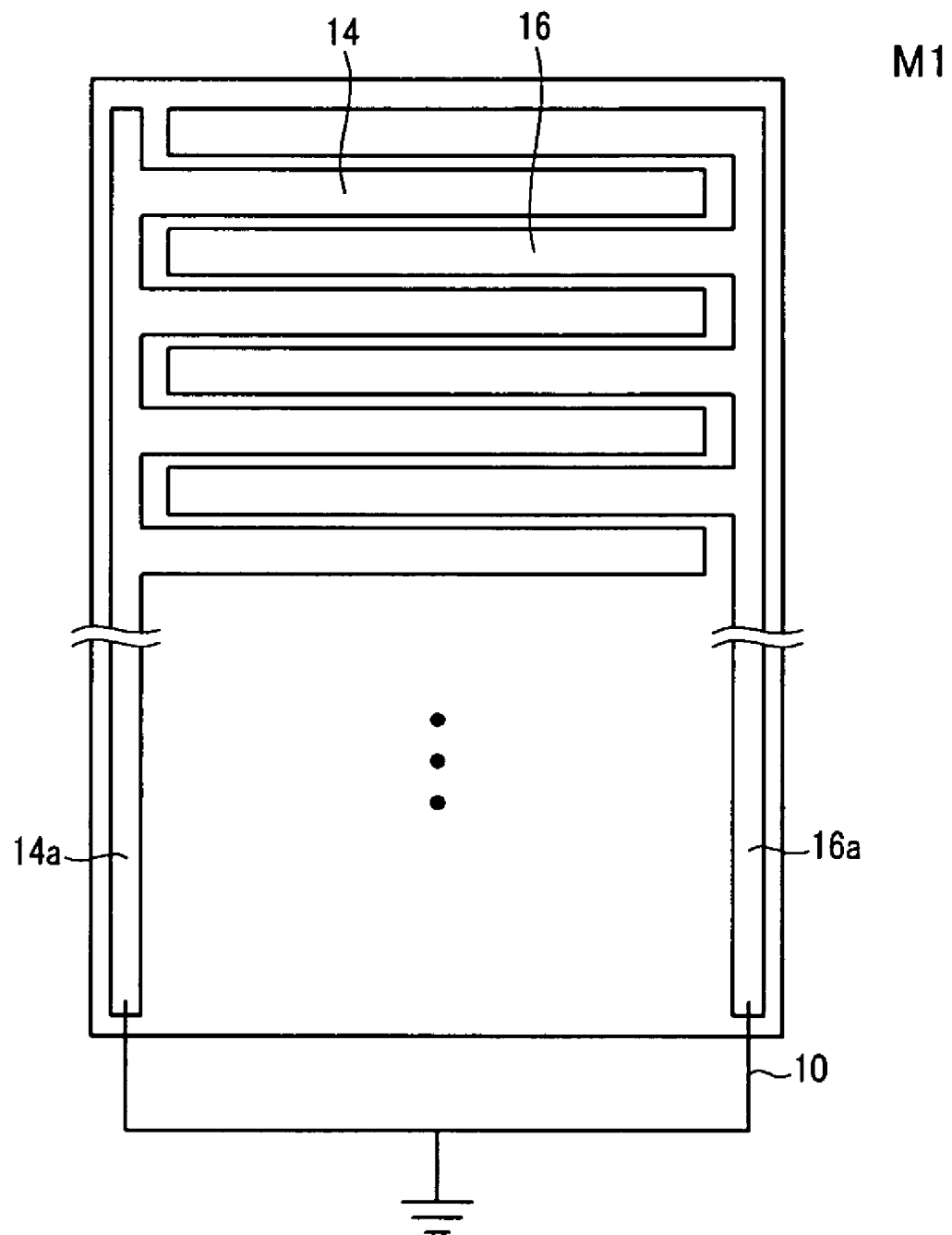
FIG. 8A is a schematic view showing an operation of the first electrodes and the second electrodes in the first mode.

An operation of the electrodes in the first mode M1 will be described hereinafter. FIG. 8A shows an operation of the first electrodes and the second electrodes during the first period $T_1$.

As shown in FIG. 8A, a reference voltage such as a ground voltage is applied to each of the first electrodes 14 and the second electrodes 16 through the first connection electrode 14a and the second connection electrode 16a, respectively. Accordingly, the first electrodes 14 and the second electrodes 16 are operated like a single-body electrode.

Figure 8B:
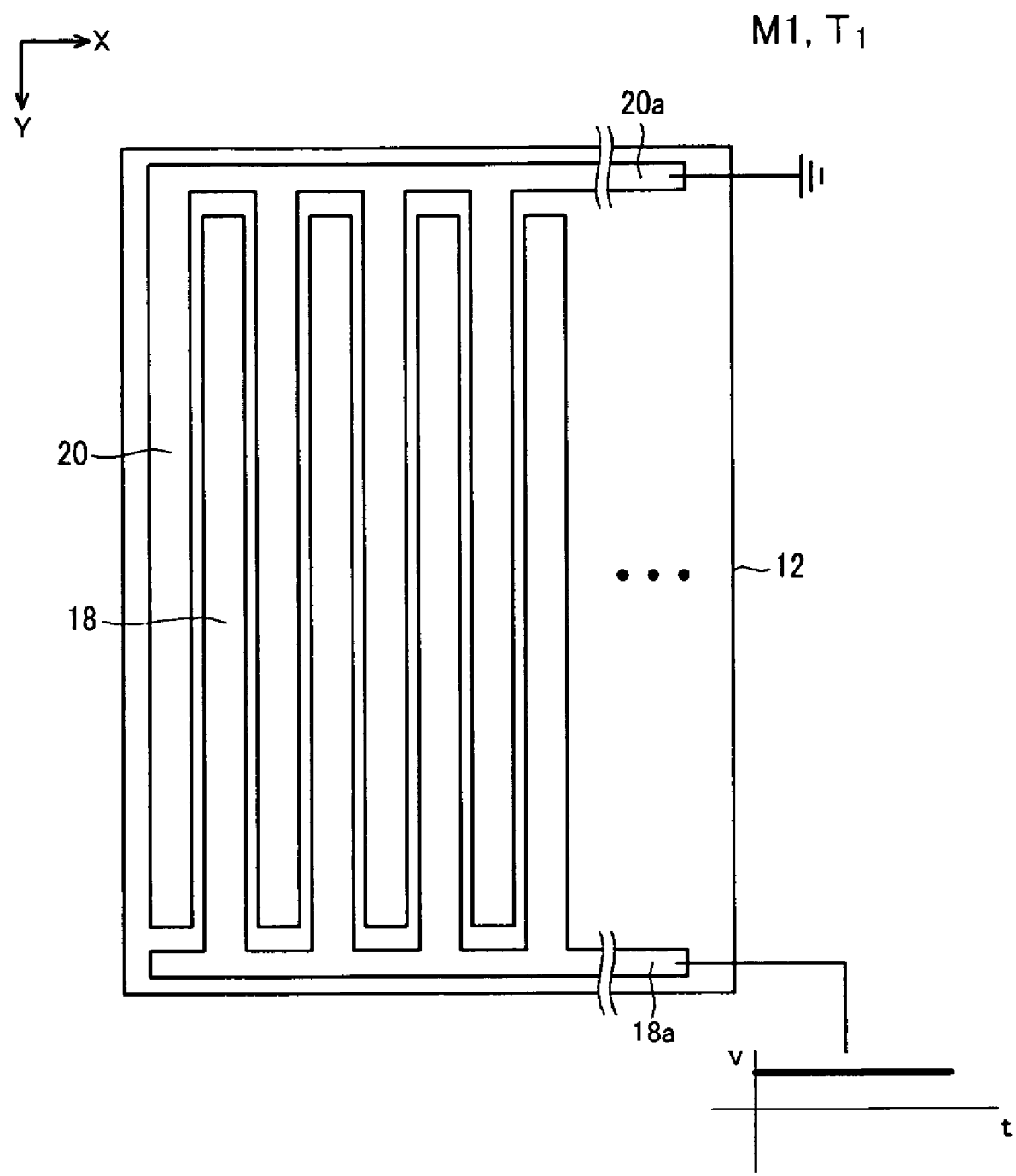
FIG. 8B is a schematic view showing an operation of the third electrodes and the fourth electrodes in the first mode.

FIG. 8B shows an operation of the third electrodes and the fourth electrodes during the period $T_1$. As shown in FIG. 8B, in the first period $T_1$ in which the panel displays the first image, the driving voltage is applied to the third electrodes 18 through the third connection electrode 18a, and a reference voltage such as a ground voltage is applied to the fourth electrodes 20 through the fourth connection electrode 20a.

Although FIG. 8B, by way of example, shows that the driving voltage is a positive voltage, the driving voltage may also be a negative voltage or a voltage such that a positive voltage and a negative voltage are alternated according to a certain frequency.

Accordingly, during the first period $T_1$ in the first mode M1, the first electrodes 14 and the second electrodes 16 that cover substantially all the inner surface area of the first substrate 10 serve as a common electrode, and the third electrodes 18 formed on the second substrate 12 operate the liquid crystals 22 (see FIG. 2, for example).

When the barrier 200 is a liquid crystal display using a normally black mode of transmission, portions of the barrier on which the third electrodes 18 are located serve as light transmission portions, and portions of the barrier on which the fourth electrodes 20 are located serve as light interception portions during the first period $T_1$.

When the barrier 200 is a liquid crystal display using a normally white mode of transmission, portions of the barrier on which the third electrodes 18 are located serve as light interception portions, and portions of the barrier on which the fourth electrodes 20 are located serve as light transmission portions during the first period $T_1$.

Accordingly, the barrier 200 features a striped pattern such that the light transmission portions of the barrier are formed to extend along the second direction (the direction of the Y-axis in FIGS. 8A and 8B).

In the third period $T_3$ during which the panel displays the second image, the reference voltage is applied to the third electrodes 18 through the third connection electrode 18a, and the driving voltage is applied to the fourth electrodes 20 through the fourth connection electrode 20a.

Accordingly, during the third period $T_3$ in the first mode M1, the first electrodes 14 and the second electrodes 16 serve as a common electrode, and the fourth electrodes 20 operate the liquid crystals 22 (see FIG. 2, for example).

When the barrier 200 is a liquid crystal display using a normally black mode of transmission, portions of the barrier on which the fourth electrodes 20 are located serve as light transmission portions, and portions of the barrier on which the third electrodes 18 are located serve as light interception portions during the third period $T_3$.

When the barrier 200 is a liquid crystal display using a normally white mode of transmission, portions of the barrier on which the fourth electrodes 20 are located serve as light interception portions, and portions of the barrier on which the third electrodes 18 are located serve as light transmission portions during the third period $T_3$.

Accordingly, in the third period $T_3$, a pattern of the light transmission portions and the light interception portions is formed that is opposite to the pattern of the light transmission portions and the light interception portions formed in the first period $T_1$.

In this way, the array of the pixels formed on the panel and the pattern formed of the electrodes on the barrier correspond to each other in the first period $T_1$ and in the third period $T_3$.

According to the operation of the panel and the barrier, the left eye of a user sees the image displayed by the first pixel columns 30 during the first period $T_1$, and sees the image displayed by the second pixel columns 32 during the third period $T_3$.

Furthermore, the right eye of the user sees the image displayed by the second pixel columns 32 during the first period $T_1$, and sees the image displayed by the first pixel columns 30 during the third period $T_3$. Accordingly, the user can see a three-dimensional image having a resolution that is equal to a resolution of a 2D image.

An operation of the three-dimensional display device according to the exemplary embodiment of the present invention in the second mode M2 will be described hereinafter in more detail.

Figure 9:
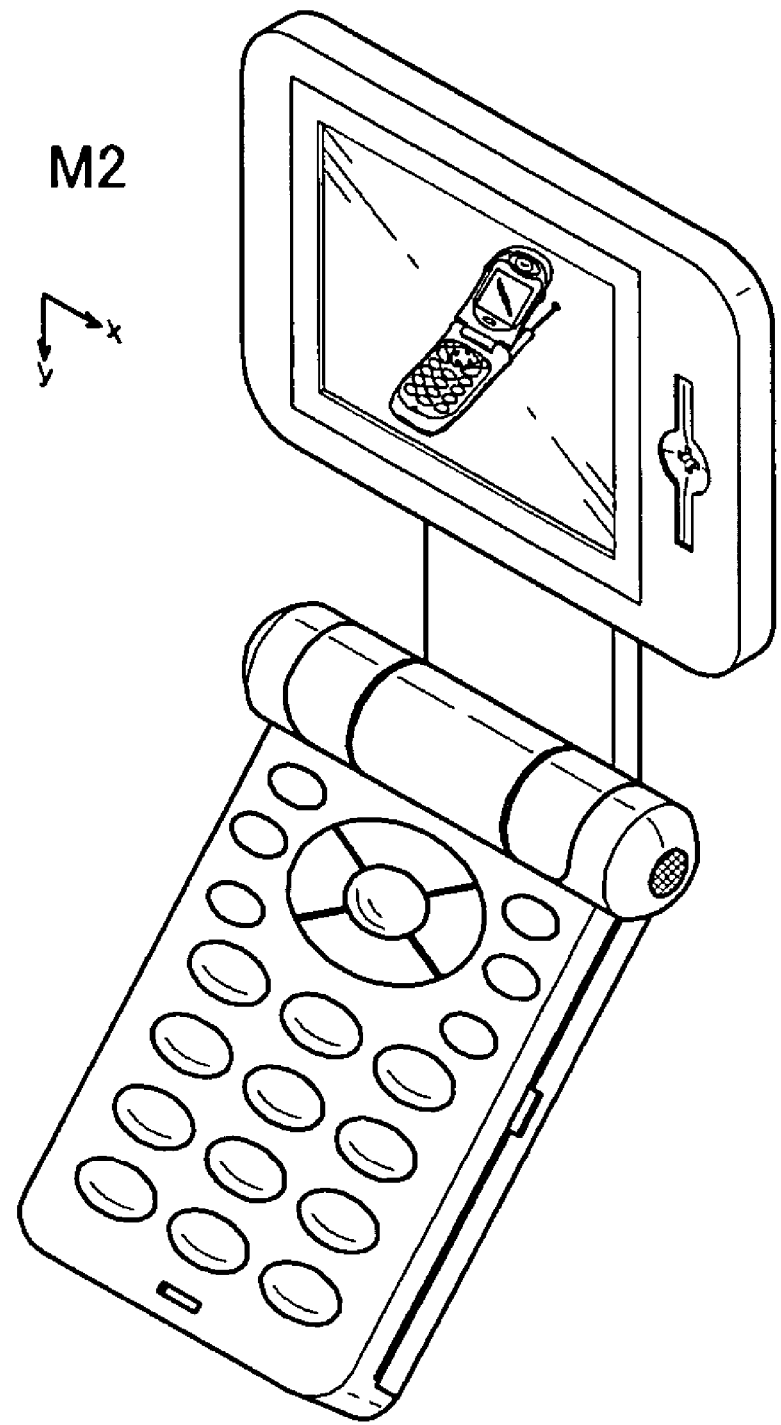
FIG. 9 is a perspective view of an electronic device operating in a second mode for which the three-dimensional display device according to the exemplary embodiment of the present invention has been adapted.

FIG. FIG. 9 shows an electronic device for which the three-dimensional display device according to the exemplary embodiment of the present invention is used. As shown, the electronic device may be a mobile phone.

During operation of the three-dimensional display device in the second mode M2, the panel 100 displays a landscape-type view. Generally, operation of the barrier corresponds to an orientation of the panel. The driving method of the three-dimensional display device will be described more concretely hereinafter.

Figure 10:
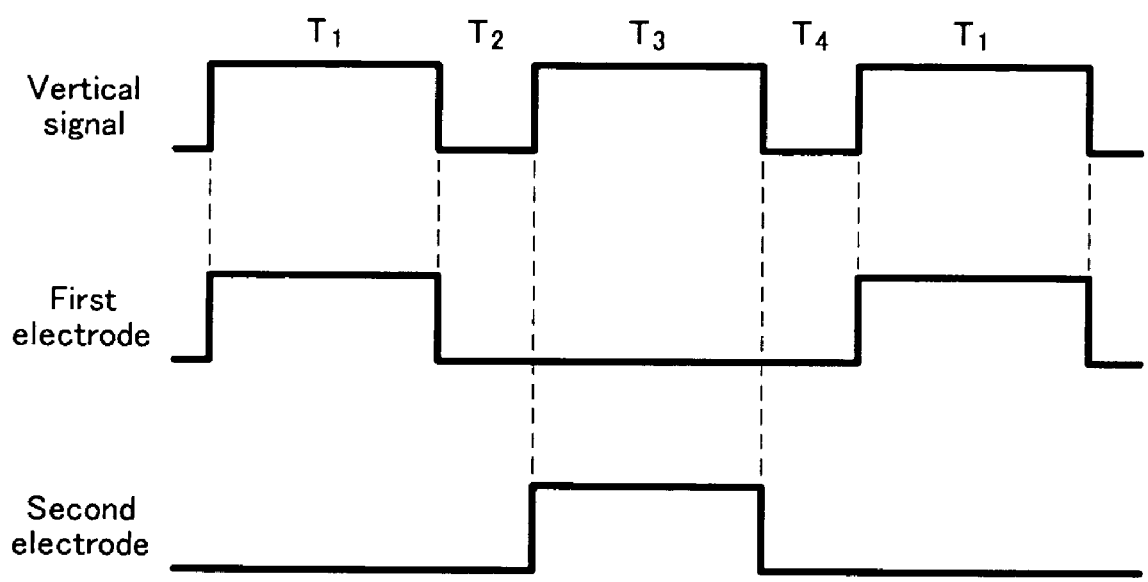
FIG. 10 is a graph showing relationships between the vertical signal and voltages applied to the first electrodes and the second electrodes when the three-dimensional display device is oriented in the second mode.

FIG. 10 shows in graphical form relationships between the vertical signal, a voltage applied to the first electrodes 14, and a voltage applied to the second electrodes 16 in the second mode M2.

The vertical signal input by the panel control unit 110 includes a series of voltages. During a first period $T_1$, the vertical signal has a higher level voltage. During a second period $T_2$, the vertical signal has a lower level voltage. During a third period $T_3$, the vertical signal has the higher level voltage. During a fourth period $T_4$, the vertical signal has the lower level voltage.

The barrier 200 is operated by the barrier driving signal that is synchronized with the vertical signal. Accordingly, the driving voltage is applied to the first electrodes during the first period $T_1$, and the driving voltage is applied to the second electrodes during the third period $T_3$.

Figure 11A:
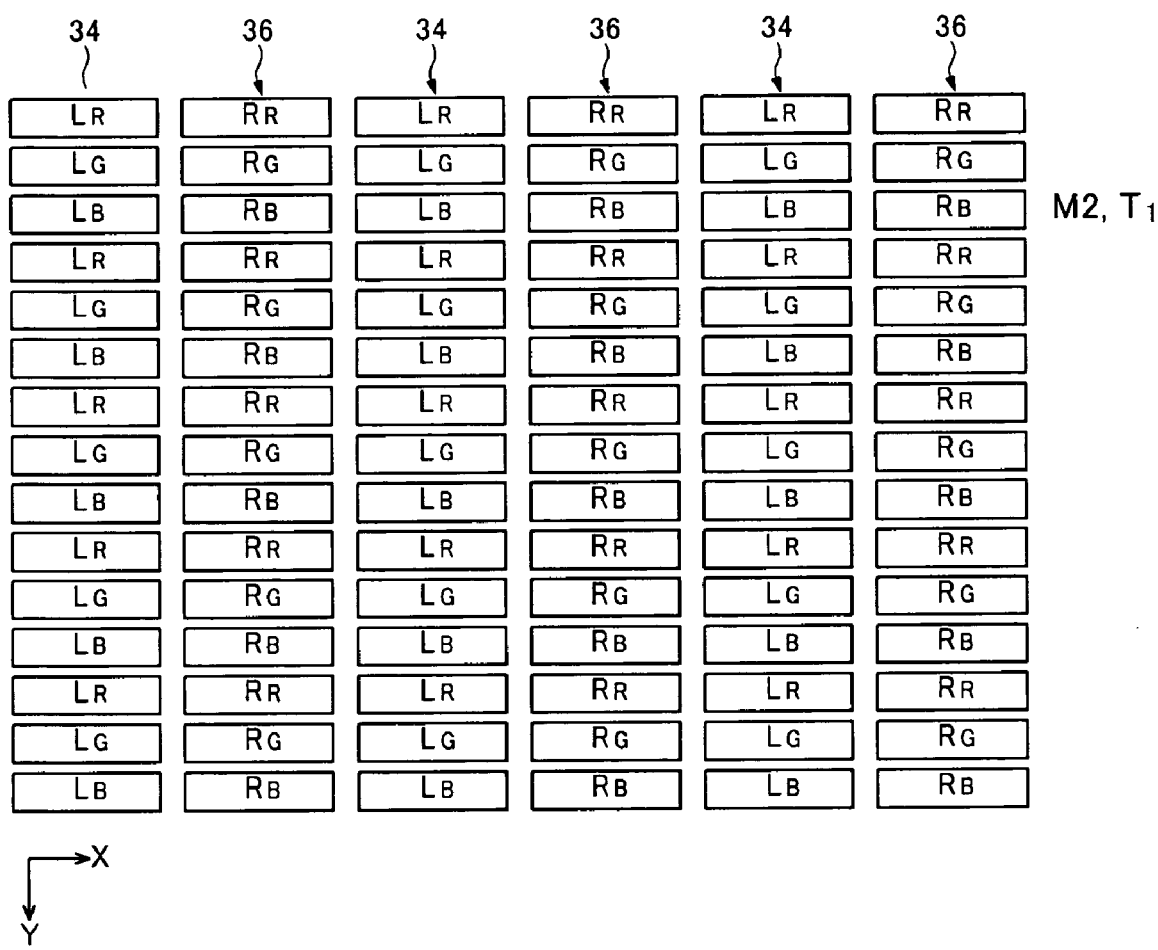
FIG. 11A is a schematic view showing arrays of the pixels in the second mode during the first period.
Figure 11B:
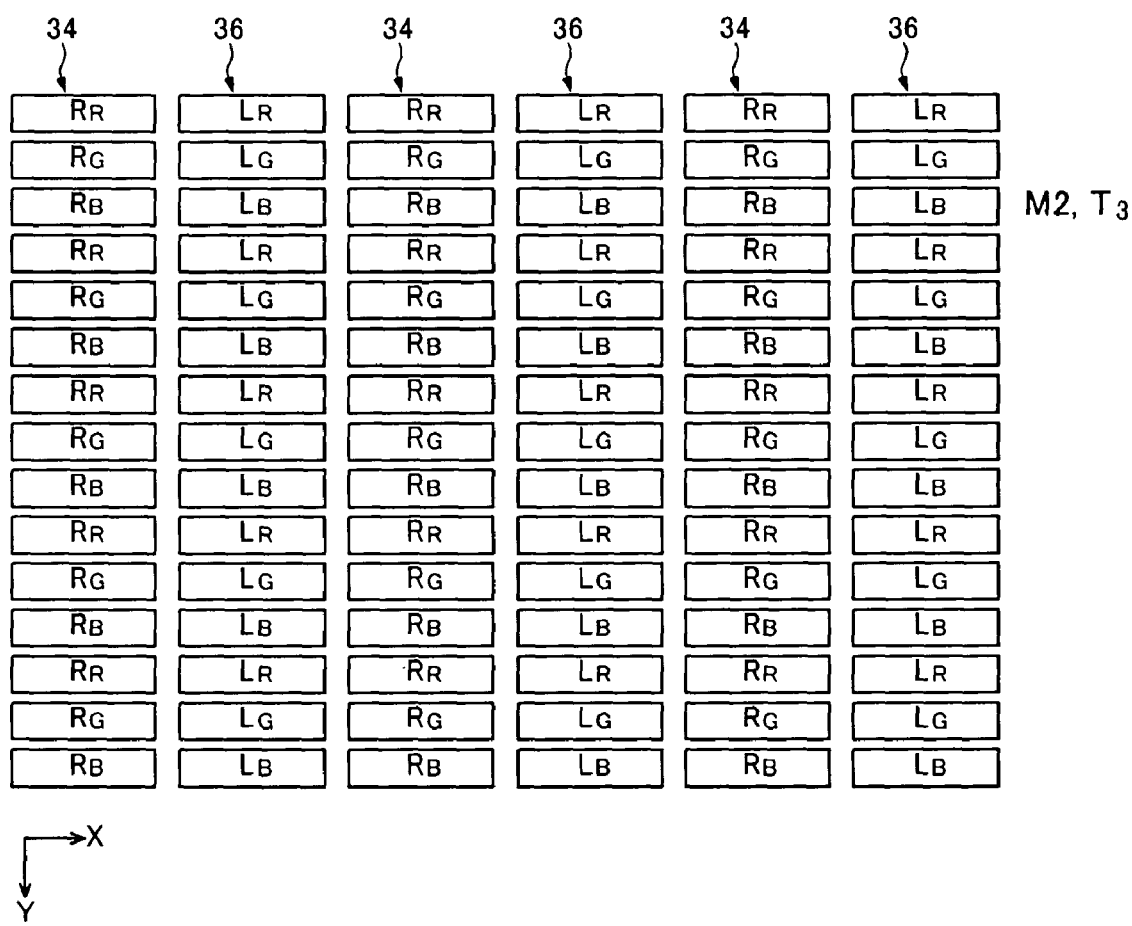
FIG. 11B is a schematic view showing arrays of the pixels in the second mode during the third period.

FIGS. 11A and 11B each show an array of pixels. First pixel rows 34 and second pixel rows 36 are formed along the second direction (the direction of the Y-axis in FIG. 11A) and are arranged alternately and repeatedly along the first direction (the direction of the X-axis in FIG. 11A).

As shown in FIG. 11A, in the first period $T_1$, the first pixel rows 34 display the left eye image corresponding to the left eye image signal, and the second pixel rows 36 display the right eye image corresponding to the right eye image signal.

Accordingly, a first image is displayed on the panel during the first period $T_1$.

Then, as shown in FIG. 11B, in the third period $T_3$, the first pixel rows 34 display the right eye image corresponding to the right eye image signal, and the second pixel rows 36 display the left eye image corresponding to the left eye image signal.

Accordingly, a second image is displayed on the panel during the third period $T_3$.

Figure 12A:
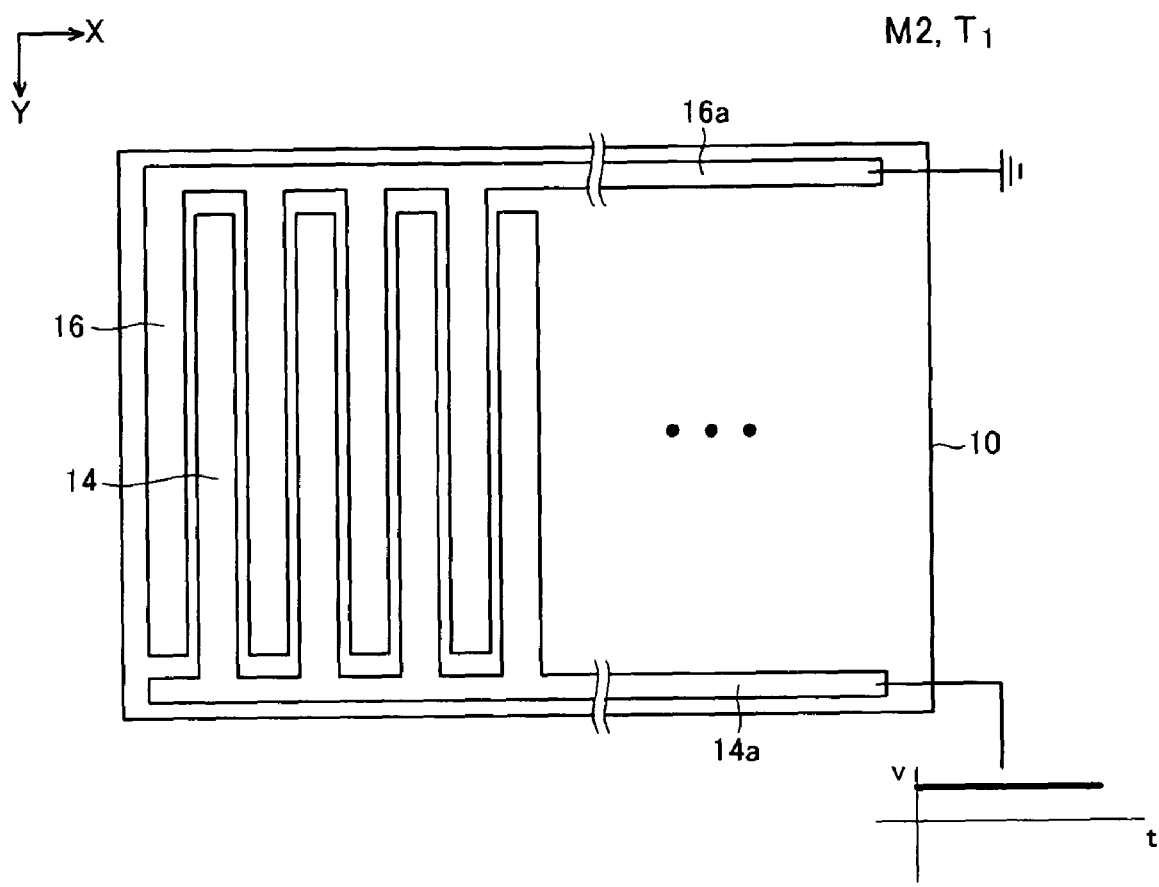
FIG. 12A is a schematic view showing an operation of the first electrodes and the second electrodes in the second mode.

An operation of the electrodes in the second mode M2 will be described hereinafter in more detail. FIG. 12A shows an operation of the first electrodes and the second electrodes during the first period $T_1$.

As shown in FIG. 12A, in the first period $T_1$, in which the panel displays the first image, the driving voltage is applied to the first electrodes 14 through the first connection electrode 14a, and a reference voltage such as a ground voltage is applied to the second electrodes 16 through the second connection electrode 16a.

Although FIG. 12A, by way of example, shows that the driving voltage is a positive voltage, the driving voltage may also be a negative voltage or a voltage such that a positive voltage and a negative voltage are alternated according to a certain frequency.

Figure 12B:
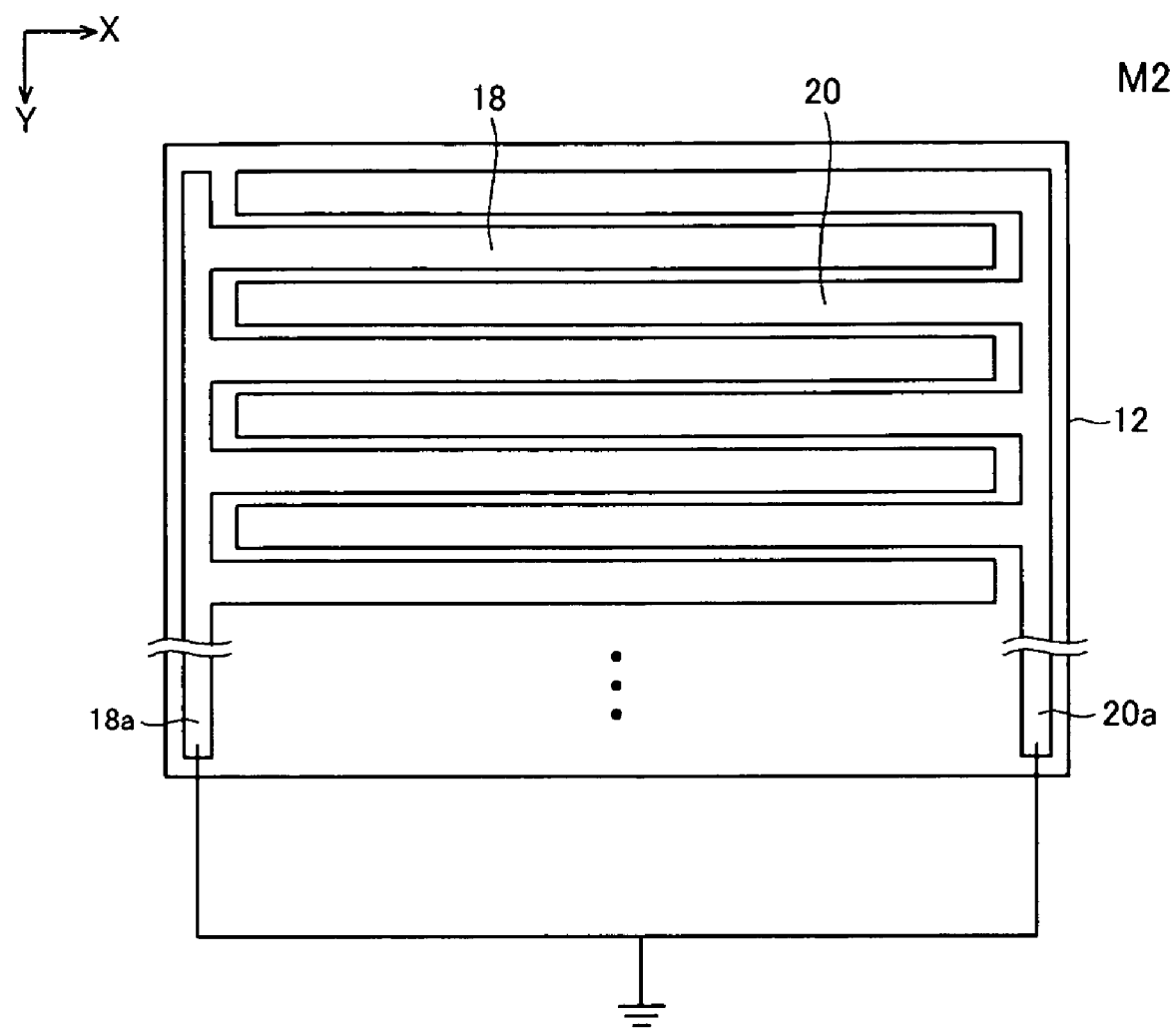
FIG. 12B is a schematic view showing the operation of the third electrodes and the fourth electrodes in the second mode.

As shown in FIG. 12B, a reference voltage such as a ground voltage is applied to each of the third electrodes 18 and the fourth electrodes 20 through the third connection electrode 18a and the fourth connection electrode 18a, respectively. Accordingly, the third electrodes 18 and the fourth electrodes 20 are operated like a single-body electrode.

Accordingly, during the first period $T_1$ in the second mode M2, the first electrodes 14 and the second electrodes 16 operate the liquid crystals, and the third electrodes 18 and the fourth electrodes 20 formed on the second substrate 12 serve as a common electrode.

When the barrier 200 is a liquid crystal display using a normally black mode of transmission, portions of the barrier on which the first electrodes 14 are located serve as light transmission portions, and portions of the barrier on which the second electrodes 16 are located serve as light interception portions during the first period $T_1$.

When the barrier 200 is a liquid crystal display using a normally white mode of transmission, portions of the barrier on which the first electrodes 14 are located serve as light interception portions, and portions of the barrier on which the second electrodes 16 are located serve as light transmission portions during the first period $T_1$.

Accordingly, the barrier 200 features a striped pattern such that the light transmission portions of the barrier are formed to extend along the second direction (the direction of the Y-axis in FIGS. 12A and 12B).

In the third period $T_3$ during which the panel displays the second image, the reference voltage is applied to the first electrodes 14 through the first connection electrode 14a, and the driving voltage is applied to the second electrodes 16 through the second connection electrode 16a.

Accordingly, during the third period $T_3$ in the first mode M2, the second electrodes 16 operate the liquid crystals, and the third electrodes 18 and the fourth electrodes 20 serve as a common electrode.

When the barrier 200 is a liquid crystal display using a normally black mode of transmission, portions of the barrier on which the second electrodes 16 are located serve as light transmission portions, and portions of the barrier on which the first electrodes 14 are located serve as light interception portions during the third period $T_3$.

When the barrier 200 is a liquid crystal display using a normally white mode of transmission, portions of the barrier on which the second electrodes 16 are located serve as light interception portions, and portions of the barrier on which the first electrodes 14 are located serve as light transmission portions during the third period $T_3$.

Accordingly, in the third period $T_3$, a pattern of the light transmission portions and the light interception portions is formed that is opposite to the pattern of the light transmission portions and the light interception portions formed in the first period $T_1$.

In this way, the array of pixels formed on the panel and the pattern formed of the electrodes on the barrier correspond to each in the first period $T_1$ and in the third period $T_3$.

According to the operation of the panel and the barrier, the left eye of a user sees the image displayed by the first pixel rows 34 during the first period $T_1$, and sees the image displayed by the second pixel rows 36 during the third period $T_3$.

Furthermore, the right eye of the user sees the image displayed by the second pixel rows 36 during the first period $T_1$, and sees the image displayed by the first pixel rows 34 during the third period $T_3$. Accordingly, the user can see a three-dimensional image having a resolution that is equal to a resolution of a 2D image.

As described above, the three-dimensional display device according to an exemplary embodiment of the present invention can provide both a portrait-type view and a landscape-type view, and can also provide a three-dimensional image of a high resolution.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A three-dimensional display device comprising:
   a panel adapted to time-share an image to display left and right eye images;
   a panel control unit for controlling the panel by applying a display control signal including vertical and horizontal signals to the panel;
   a barrier facing the panel and for separating the image of the panel into the left and right eye images; and
   a barrier control unit for controlling the barrier,
   wherein the panel is adapted to be oriented in a first mode to provide a portrait-type view and a second mode to provide a landscape-type view, and
   wherein the barrier is operated corresponding to the orientation mode of the panel.

2. The three-dimensional display device of claim 1, wherein the barrier comprises:
   a first substrate;
   a plurality of first electrodes arranged to extend along a first direction on the first substrate;
   a plurality of second electrodes arranged between the first electrodes on the first substrate;
   a second substrate facing the first substrate;
   a plurality of third electrodes arranged on the second substrate to extend along a second direction perpendicular to the first direction;
   a plurality of fourth electrodes arranged between the third electrodes on the second substrate; and
   a liquid crystal layer located between the first substrate and the second substrate.

3. The three-dimensional display device of claim 2, wherein the barrier control unit is adapted to apply a reference voltage or a driving voltage to the first electrodes, the second electrodes, the third electrodes, and the fourth electrodes according to a barrier control signal synchronized with the vertical signal.

4. The three-dimensional display device of claim 3, wherein the vertical signal has:
   a higher level voltage during a first period;
   a lower level voltage during a second period following the first period;
   the higher level voltage during a third period following the second period; and
   the lower level voltage during a fourth period following the third period,
   wherein the first period, the second period, the third period, and the fourth period constitute a repeatable cycle.

5. The three-dimensional display device of claim 4, wherein the panel displays, during the first period, a first image including the left and right eye images formed in a first pattern, and the panel displays, during the third period, a second image including the left and right eye images formed in a second pattern, and wherein the second pattern is opposite to the first pattern.

6. The three-dimensional display device of claim 5, wherein, when the panel is oriented in the first mode, a plurality of first pixel columns and a plurality of second pixel columns respectively corresponding to the third electrodes and the fourth electrodes are arranged to extend along the second direction and are arranged alternately and repeatedly along the first direction on the panel, the left eye image and the right eye image of the first image are respectively displayed on the first pixel columns and the second pixel columns during the first period, and the right eye image and the left eye image of the second image are respectively displayed on the first pixel columns and the second pixel columns during the third period, and wherein, when the panel is oriented in the second mode,
a plurality of first pixel rows and a plurality of second pixel rows respectively corresponding to the first electrodes and the second electrodes are arranged to extend along the first direction and arranged alternately and repeatedly along the second direction on the panel, the left eye image and the right eye image of the first image are respectively displayed on the first pixel rows and the second pixel rows during the first period, and the right eye image and the left eye image of the second image are respectively displayed on the first pixel rows and the second pixel rows during the third period.

7. The three-dimensional display device of claim 4, wherein, when the panel is oriented in the first mode, the reference voltage is applied to the first electrodes and the second electrodes during the first period, the second period, the third period, and the fourth period, and the driving voltage is applied to the third electrodes during the first period and to the fourth electrodes during the third period, and wherein, when the panel is oriented in the second mode, the reference voltage is applied to the third electrodes and the fourth electrodes during the first period, the second period, the third period, and the fourth period, and the driving voltage is applied to the first electrodes during the first period and to the second electrodes during the third period.

8. The three-dimensional display device of claim 2, wherein the barrier further comprises:
a first connection electrode for electrically connecting the first electrodes to each other;
a second connection electrode for electrically connecting the second electrodes to each other;
a third connection electrode for electrically connecting the third electrodes to each other; and
a fourth connection electrode for electrically connecting the fourth electrodes to each other.

9. The three-dimensional display device of claim 1, wherein the panel separates the image into the left and right eye images by sub pixel units.

10. The three-dimensional display device of claim 1, wherein the panel separates the image into the left and right eye images by pixel units.

11. A driving method of a three-dimensional display device adapted to be oriented in a first mode to provide a portrait-type view and a second mode to provide a landscape-type view and comprising a panel adapted to time-share an image, a panel control unit for controlling the panel by applying a display control signal, a barrier adapted to separate the image into left and right eye images, and a barrier control unit for controlling the barrier, the driving method comprising:
applying the display control signal to the panel and the barrier control unit;
applying the barrier driving signal to the barrier;
applying a reference voltage or a driving voltage to electrodes of the barrier according to the barrier driving signal; and
forming light transmission portions and light interception portions in the barrier according to operation of a liquid crystal layer of the barrier, and indicating the display control signal on the panel.

12. The driving method of the three-dimensional display device of claim 11, wherein the barrier comprises:
a first substrate;
a plurality of first electrodes arranged to extend along a first direction on the first substrate;
a plurality of second electrodes arranged between the first electrodes on the first substrate;
a second substrate facing the first substrate;
a plurality of third electrodes arranged on the second substrate to extend along a second direction perpendicular to the first direction;
a plurality of fourth electrodes arranged between the third electrodes on the second substrate; and
the liquid crystal layer, wherein the liquid crystal layer is located between the first substrate and the second substrate.

13. The driving method of the three-dimensional display device of claim 12, wherein the display control signal comprises a vertical signal and a horizontal signal,
and wherein the barrier control signal is synchronized with the vertical signal.

14. The driving method of the three-dimensional display device of claim 13, wherein the vertical signal has:
a higher level voltage during a first period;
a lower level voltage during a second period following the first period;
the higher level voltage during a third period following the second period; and
the lower level voltage during a fourth period following the third period,
wherein the first period, the second period, the third period, and the fourth period constitute a repeatable cycle.

15. The driving method of the three-dimensional display device of claim 14, wherein the panel displays, during the first period, a first image including the left and right eye images formed in a first pattern and displays, during the third period, a second image including the left and right eye images formed in a second pattern, wherein the second pattern is opposite to the first pattern.

16. The driving method of the three-dimensional display device of claim 15, wherein, when the panel is oriented in the first mode,
a plurality of first pixel columns and a plurality of second pixel columns respectively corresponding to the third electrodes and the fourth electrodes are arranged to extend along the second direction and are arranged alternately and repeatedly along the first direction on the panel, the left eye image and the right eye image of the first image are respectively displayed on the first pixel columns and the second pixel columns during the first period, the right eye image and the left eye image of the second image are respectively displayed on the first pixel columns and the second pixel columns during the third period, and wherein, when the panel is oriented in the second mode, a plurality of first pixel rows and a plurality of second pixel rows respectively corresponding to the first electrodes and the second electrodes are arranged to extend along the first direction and are arranged alternately and repeatedly along the second direction on the panel, the left eye image and the right eye image of the first image are respectively displayed on the first pixel rows and the second pixel rows during the first period, and the right eye image and the left eye image of the second image are respectively displayed on the first pixel rows and the second pixel rows during the third period.

17. The driving method of the three-dimensional display device of claim 14, wherein, when the panel is oriented in the first mode, the reference voltage is applied to the first electrodes and the second electrodes during the first period, the second period, the third period, and the fourth period, and the driving voltage is applied to the third electrodes during the first period and to the fourth electrodes during the third period, and wherein, when the panel is oriented in the second mode, the reference voltage is applied to the third electrodes and the fourth electrodes during the first period, the second period, the third period, and the fourth period, and the driving voltage is applied to the first electrodes during the first period and to the second electrodes during the third period.

18. The driving method of the three-dimensional display device of claim 11, wherein the reference voltage is a ground voltage, and the driving voltage is a predetermined positive or negative voltage.

19. The driving method of the three-dimensional display device of claim 11, wherein the driving voltage alternates between a positive level and a negative level at a predetermined frequency.

* * * * *